(12) United States Patent
Ladkat et al.

(10) Patent No.: US 10,767,124 B2
(45) Date of Patent: Sep. 8, 2020

(54) PROCESS FOR RECOVERING HYDROGEN AND LIQUEFIED PETROLEUM GAS FROM GASEOUS STREAMS

(71) Applicant: UOP LLC, Des Plaines, IL (US)

(72) Inventors: Kiran Ladkat, Gurgaon (IN); Neeraj Tiwari, Gurgaon (IN)

(73) Assignee: UOP LLC, Des Plaines, IL (US)

( * ) Notice: Subject to any disclaimer, the term of this patent is extended or adjusted under 35 U.S.C. 154(b) by 132 days.

(21) Appl. No.: 15/473,800

(22) Filed: Mar. 30, 2017

(65) Prior Publication Data

US 2017/0283715 A1    Oct. 5, 2017

Related U.S. Application Data

(60) Provisional application No. 62/316,474, filed on Mar. 31, 2016.

(51) Int. Cl.
*C01B 3/52* (2006.01)
*C10G 67/02* (2006.01)

(52) U.S. Cl.
CPC ............... *C10G 67/02* (2013.01); *C01B 3/52* (2013.01); *C01B 2203/065* (2013.01); *C10G 2300/40* (2013.01)

(58) Field of Classification Search
None
See application file for complete search history.

(56) References Cited

U.S. PATENT DOCUMENTS

| | | | |
|---|---|---|---|
| 3,430,418 A | 3/1969 | Wagner | |
| 3,574,090 A | 4/1971 | Hallman | |
| 4,363,718 A | 12/1982 | Klotz | |
| 4,743,356 A | 5/1988 | Soederberg et al. | |
| 4,822,480 A | 4/1989 | Harandi et al. | |
| 7,259,288 B2 | 8/2007 | Khan | |
| 7,462,276 B2 | 12/2008 | Wang et al. | |
| 9,084,945 B2 | 7/2015 | Hoehn et al. | |
| 2013/0305593 A1* | 11/2013 | Eizenga | B01D 19/0005 44/308 |
| 2015/0047503 A1* | 2/2015 | Hoehn | B01D 19/0036 95/92 |
| 2015/0053590 A1 | 2/2015 | Ladkat et al. | |

FOREIGN PATENT DOCUMENTS

| | | |
|---|---|---|
| WO | 2005082090 A2 | 9/2005 |
| WO | 2011006952 A2 | 1/2011 |

OTHER PUBLICATIONS

Peramanu, "Economics of hydrogen recovery processes for the purification of hydroprocessor purge and off-gases", International Journal of Hydrogen Energy 24 (1999) 405-424.
PCT Search Report dated Jul. 6, 2017 for corresponding PCT Application No. PCT/US2017/023384.

* cited by examiner

*Primary Examiner* — Colin W. Slifka
(74) *Attorney, Agent, or Firm* — Paschall & Associates, LLC; James C. Paschall

(57) ABSTRACT

A process for recovery hydrogen and LPG from a gaseous separated hydroprocessed stream and a stripper gaseous stream and/or a fractionator gaseous stream by increasing the pressure of the stripper gaseous stream and/or the fractionator gaseous stream. Both streams or all three streams can be subjected to sponge absorption and hydrogen recovery in series.

10 Claims, 3 Drawing Sheets

PROCESS FOR RECOVERING HYDROGEN AND LIQUEFIED PETROLEUM GAS FROM GASEOUS STREAMS

CROSS-REFERENCE TO RELATED APPLICATION

This application claims priority from Provisional Application No. 62/316,474 filed Mar. 31, 2016, the contents of which cited application are hereby incorporated by reference in its entirety.

FIELD

The field is the hydroprocessing of hydrocarbon streams, particularly the recovery of hydrogen and liquefied petroleum gas from hydroprocessed hydrocarbon streams.

BACKGROUND

Hydroprocessing can include processes which convert hydrocarbons in the presence of hydroprocessing catalyst and hydrogen to more valuable products. Hydrocracking is a hydroprocessing process in which hydrocarbons crack in the presence of hydrogen and hydrocracking catalyst to lower molecular weight hydrocarbons. Depending on the desired output, a hydrocracking unit may contain one or more fixed beds of the same or different catalyst. Slurry hydrocracking is a slurried catalytic process used to crack residue feeds to gas oils and fuels.

Hydroprocessing recovery units typically include an array of separators for cooling and depressurizing hydroprocessed effluent and separating gaseous streams from liquid streams and a stripping column for stripping hydroprocessed liquid with a stripping medium such as steam to remove unwanted hydrogen sulfide. The stripped stream then is typically heated and fractionated in a product fractionation column to recover products such as naphtha, kerosene and diesel. Lighter hydrocarbons may be recovered from a condensed overhead stream.

In a refinery, hydrogen has a prime importance and recovery of hydrogen improves refinery profitability significantly. Pressure swing absorption (PSA) units are useful for purifying hydrogen by adsorbing larger molecules from the hydrogen stream at high pressure and then releasing the larger molecules at swing to lower pressure to provide a tail gas stream.

In many regions liquefied petroleum gas (LPG) is also important for petrochemical and fuel uses and additional recovery of LPG can also boost profit. Naphtha is also useful for fuel and petrochemical feed stock and its further recovery is desirable.

There is a continuing need, therefore, for improved methods of recovering hydrogen, LPG and naphtha from hydroprocessed effluent streams.

BRIEF SUMMARY

We have discovered a process for recovering hydrogen and LPG from a gaseous separated hydroprocessed stream and a stripper gaseous stream and/or a fractionator gaseous stream by increasing pressure of the stripper gaseous stream and/or the fractionator gaseous stream. Both streams or all three streams can be subjected to sponge absorption and hydrogen recovery together in series.

DEFINITIONS

Figure 1:
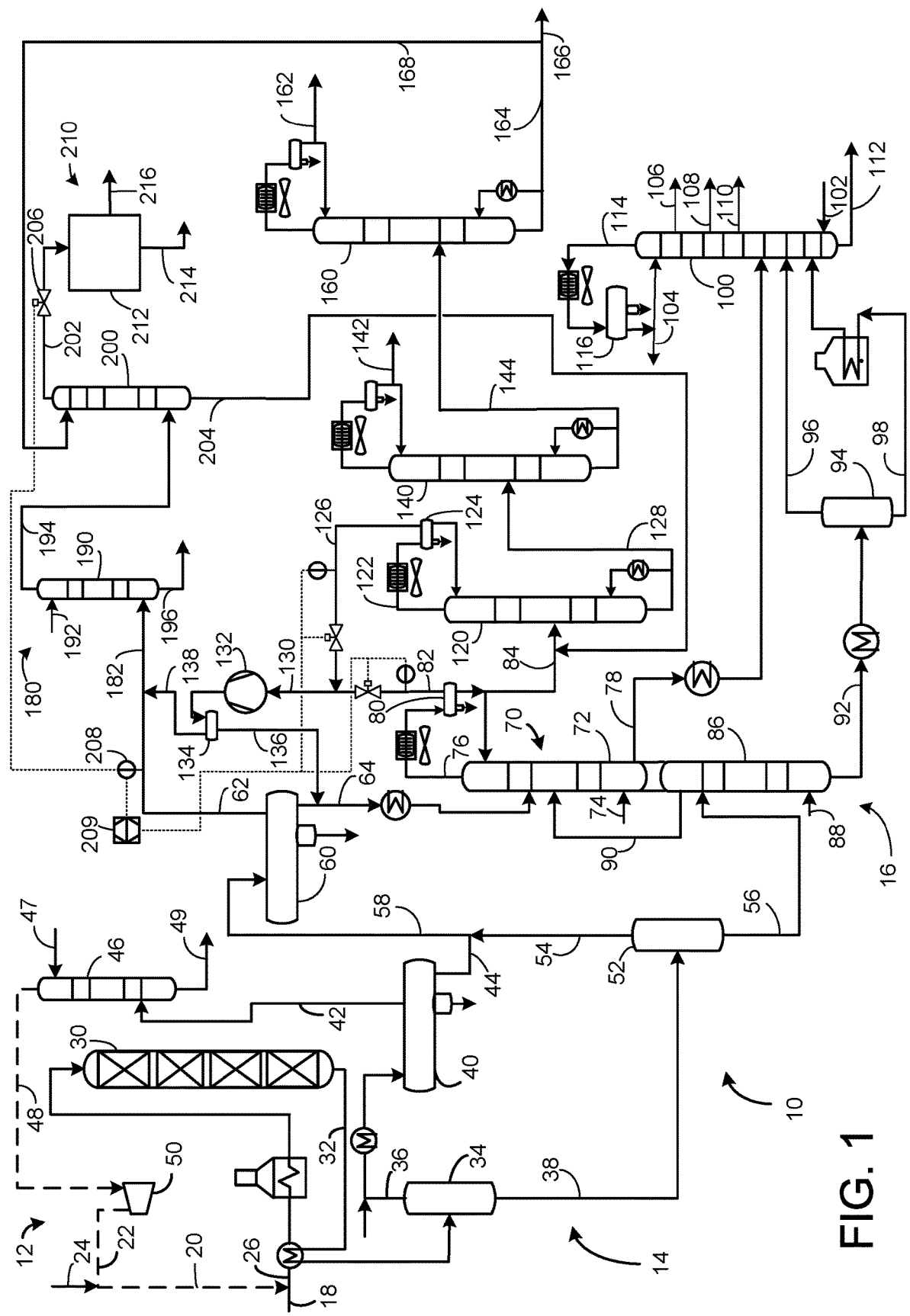
FIG. 1 is a schematic drawing of a hydroprocessing unit with a recovery section.

The term "communication" means that material flow is operatively permitted between enumerated components.

The term "downstream communication" means that at least a portion of material flowing to the subject in downstream communication may operatively flow from the object with which it communicates.

The term "upstream communication" means that at least a portion of the material flowing from the subject in upstream communication may operatively flow to the object with which it communicates.

The term "direct communication" means that flow from the upstream component enters the downstream component without undergoing a compositional change due to physical fractionation or chemical conversion.

The term "bypass" means that the object is out of downstream communication with a bypassing subject at least to the extent of bypassing.

As used herein, the term "a component-rich stream" means that the rich stream coming out of a vessel has a greater concentration of the component than the feed to the vessel.

As used herein, the term "a component-lean stream" means that the lean stream coming out of a vessel has a smaller concentration of the component than the feed to the vessel.

The term "column" means a distillation column or columns for separating one or more components of different volatilities. Unless otherwise indicated, each column includes a condenser on an overhead of the column to condense and reflux a portion of an overhead stream back to the top of the column and a reboiler at a bottom of the column to vaporize and send a portion of a bottoms stream back to the bottom of the column. Absorber and scrubbing columns do not include a condenser on an overhead of the column to condense and reflux a portion of an overhead stream back to the top of the column and a reboiler at a bottom of the column to vaporize and send a portion of a bottoms stream back to the bottom of the column. Feeds to the columns may be preheated. The overhead pressure is the pressure of the overhead vapor at the vapor outlet of the column. The bottom temperature is the liquid bottom outlet temperature. Overhead lines and bottoms lines refer to the net lines from the column downstream of any reflux or reboil to the column unless otherwise indicated. Stripping columns omit a reboiler at a bottom of the column and instead provide heating requirements and separation impetus from a fluidized inert vaporous media such as steam.

As used herein, the term "True Boiling Point" (TBP) means a test method for determining the boiling point of a material which corresponds to ASTM D-2892 for the production of a liquefied gas, distillate fractions, and residuum of standardized quality on which analytical data can be obtained, and the determination of yields of the above fractions by both mass and volume from which a graph of temperature versus mass % distilled is produced using fifteen theoretical plates in a column with a 5:1 reflux ratio.

As used herein, the term "T5" or "T95" means the temperature at which 5 volume percent or 95 volume percent, as the case may be, respectively, of the sample boils using ASTM D-86.

As used herein, the term "diesel boiling range" means hydrocarbons boiling in the range of between about 132° C. (270° F.) and the diesel cut point between about 343° C. (650° F.) and about 399° C. (750° F.) using the TBP distillation method.

As used herein, the term "separator" means a vessel which has an inlet and at least an overhead vapor outlet and a bottoms liquid outlet and may also have an aqueous stream outlet from a boot. A flash drum is a type of separator which may be in downstream communication with a separator which latter may be operated at higher pressure.

As used herein, the term "predominant" or "predominate" means greater than 50%, suitably greater than 75% and preferably greater than 90%.

DETAILED DESCRIPTION

In a fractionation section for recovering hydroprocessed product, a stripped gaseous stream from a stripper overhead receiver is routed to a scrubber column and then treated gas is routed to a sponge absorber column for recovering LPG. Sponge oil can be used to recover LPG from the stripped gaseous stream. The stripped gaseous stream also contains 30-40 vol % hydrogen which is typically routed to a fuel gas header without recovering the hydrogen. Due to the low pressure of this stream the stripped gaseous stream is not be routed to a hydrogen recovery unit such as a PSA unit to recover hydrogen. Based on a simulation study we found that at higher pressure and a substantially reduced sponge oil rate, the same or higher LPG recovery can be achieved. LPG can also be recovered from a fractionator gaseous stream.

The apparatus and process 10 for hydroprocessing hydrocarbons comprise a hydroprocessing unit 12, a separation section 14, a product recovery unit 16 and a light material recovery unit 180. A hydrocarbonaceous stream in hydrocarbon line 18 and a make-up hydrogen stream in make-up hydrogen line 24 are fed to the hydroprocessing unit 12.

A recycle hydrogen stream in recycle hydrogen line 22 may supplement the make-up hydrogen stream from line 24 to provide the hydrogen stream in the hydrogen line 20. The hydrogen stream may join the hydrocarbonaceous stream in feed line 18 to provide a hydrocarbon feed stream in feed line 26. The hydrocarbon feed stream in line 26 may be heated by heat exchange with hydroprocessed effluent stream in line 32 and in a fired heater and fed to the hydroprocessing reactor 30. The hydrocarbon feed stream is hydroprocessed in the hydroprocessing reactor 30.

In one aspect, the process and apparatus described herein are particularly useful for hydroprocessing a hydrocarbon feed stream comprising a hydrocarbonaceous feedstock. Illustrative hydrocarbonaceous feed stocks include hydrocarbon streams having initial boiling points (IBP) above about 288° C. (550° F.), such as atmospheric gas oils, vacuum gas oil (VGO) having T5 and T95 between about 315° C. (600° F.) and about 600° C. (1100° F.), deasphalted oil, coker distillates, straight run distillates, pyrolysis-derived oils, high boiling synthetic oils, cycle oils, hydrocracked feeds, catalytic cracker distillates, atmospheric residue having an IBP at or above about 343° C. (650° F.) and vacuum residue having an IBP above about 510° C. (950° F.).

Hydroprocessing that occurs in the hydroprocessing unit 12 may be hydrocracking or hydrotreating. Hydrocracking refers to a process in which hydrocarbons crack in the presence of hydrogen to lower molecular weight hydrocarbons. Hydrocracking is the preferred process in the hydroprocessing unit 12. Consequently, the term "hydroprocessing" will include the term "hydrocracking" herein. Hydrocracking also includes slurry hydrocracking in which resid feed is mixed with catalyst and hydrogen to make a slurry and cracked to lower boiling products.

The hydroprocessing that occurs in the hydroprocessing unit may also be hydrotreating. Hydrotreating is a process wherein hydrogen is contacted with hydrocarbon in the presence of hydrotreating catalysts which are primarily active for the removal of heteroatoms, such as sulfur, nitrogen and metals from the hydrocarbon feedstock. In hydrotreating, hydrocarbons with double and triple bonds may be saturated. Aromatics may also be saturated. Some hydrotreating processes are specifically designed to saturate aromatics. The cloud point or pour point of the hydrotreated product may also be reduced by hydroisomerization. A hydrocracking reactor may be preceded by a hydrotreating reactor and an optional separator (not shown) to remove sulfur and nitrogen contaminants from the feed to the hydrocracking reactor.

The hydroprocessing reactor 30 may be a fixed bed reactor that comprises one or more vessels, single or multiple beds of catalyst in each vessel, and various combinations of hydrotreating catalyst and/or hydrocracking catalyst in one or more vessels. It is contemplated that the hydroprocessing reactor 30 be operated in a continuous liquid phase in which the volume of the liquid hydrocarbon feed is greater than the volume of the hydrogen gas. The hydroprocessing reactor 30 may also be operated in a conventional continuous gas phase, a moving bed or a fluidized bed hydroprocessing reactor.

If the hydroprocessing reactor 30 is operated as a hydrocracking reactor, it may provide a total conversion of at least about 20 vol % and typically greater than about 60 vol % of the hydrocarbon feed to products boiling below the diesel cut point. A hydrocracking reactor may operate at partial conversion of more than about 30 vol % or full conversion of at least about 90 vol % of the feed based on total conversion. A hydrocracking reactor may be operated at mild hydrocracking conditions which will provide about 20 to about 60 vol %, preferably about 20 to about 50 vol %, total conversion of the hydrocarbon feed to product boiling below the diesel cut point. If the hydroprocessing reactor 30 is operated as a hydrotreating reactor, it may provide conversion per pass of about 10 to about 30 vol %.

If the hydroprocessing reactor 30 is a hydrocracking reactor, the first vessel or bed in the hydrocracking reactor 30 may include hydrotreating catalyst for the purpose of saturating, demetallizing, desulfurizing or denitrogenating the hydrocarbon feed before it is hydrocracked with hydrocracking catalyst in subsequent vessels or beds in the hydrocracking reactor 30. If the hydrocracking reactor is a mild hydrocracking reactor, it may contain several beds of hydrotreating catalyst followed by a fewer beds of hydrocracking catalyst. If the hydroprocessing reactor 30 is a slurry hydrocracking reactor, it may operate in a continuous liquid phase in an upflow mode and will appear different than in FIG. 1 which depicts a fixed bed reactor. If the hydroprocessing reactor 30 is a hydrotreating reactor it may comprise more than one vessel and multiple beds of hydrotreating catalyst. The hydrotreating reactor may also contain hydrotreating catalyst that is suited for saturating aromatics, hydrodewaxing and hydroisomerization.

A hydrocracking catalyst may utilize amorphous silica-alumina bases or low-level zeolite bases combined with one or more Group VIII or Group VIB metal hydrogenating components if mild hydrocracking is desired to produce a balance of middle distillate and gasoline. In another aspect, when middle distillate is significantly preferred in the converted product over gasoline production, partial or full hydrocracking may be performed in the first hydrocracking reactor 30 with a catalyst which comprises, in general, any crystalline zeolite cracking base upon which is deposited a Group VIII metal hydrogenating component. Additional hydrogenating components may be selected from Group VIB for incorporation with the zeolite base.

The zeolite cracking bases are sometimes referred to in the art as molecular sieves and are usually composed of silica, alumina and one or more exchangeable cations such as sodium, magnesium, calcium, rare earth metals, etc. They are further characterized by crystal pores of relatively uniform diameter between about 4 and about 14 Angstroms ($10^{-10}$ meters). It is preferred to employ zeolites having a relatively high silica/alumina mole ratio between about 3 and about 12. Suitable zeolites found in nature include, for example, mordenite, stilbite, heulandite, ferrierite, dachiardite, chabazite, erionite and faujasite. Suitable synthetic zeolites include, for example, the B, X, Y and L crystal types, e.g., synthetic faujasite and mordenite. The preferred zeolites are those having crystal pore diameters between about 8 and 12 Angstroms ($10^{-10}$ meters), wherein the silica/alumina mole ratio is about 4 to 6. One example of a zeolite falling in the preferred group is synthetic Y molecular sieve.

The natural occurring zeolites are normally found in a sodium form, an alkaline earth metal form, or mixed forms. The synthetic zeolites are nearly always prepared first in the sodium form. In any case, for use as a cracking base it is preferred that most or all of the original zeolitic monovalent metals be ion-exchanged with a polyvalent metal and/or with an ammonium salt followed by heating to decompose the ammonium ions associated with the zeolite, leaving in their place hydrogen ions and/or exchange sites which have actually been decationized by further removal of water. Hydrogen or "decationized" Y zeolites of this nature are more particularly described in U.S. Pat. No. 3,100,006.

Mixed polyvalent metal-hydrogen zeolites may be prepared by ion-exchanging first with an ammonium salt, then partially back exchanging with a polyvalent metal salt and then calcining. In some cases, as in the case of synthetic mordenite, the hydrogen forms can be prepared by direct acid treatment of the alkali metal zeolites. In one aspect, the preferred cracking bases are those which are at least about 10 wt %, and preferably at least about 20 wt %, metal-cation-deficient, based on the initial ion-exchange capacity. In another aspect, a desirable and stable class of zeolites is one wherein at least about 20 wt % of the ion exchange capacity is satisfied by hydrogen ions.

The active metals employed in the preferred hydrocracking catalysts of the present invention as hydrogenation components are those of Group VIII, i.e., iron, cobalt, nickel, ruthenium, rhodium, palladium, osmium, iridium and platinum. In addition to these metals, other promoters may also be employed in conjunction therewith, including the metals of Group VIB, e.g., molybdenum and tungsten. The amount of hydrogenating metal in the catalyst can vary within wide ranges. Broadly speaking, any amount between about 0.05 wt % and about 30 wt % may be used. In the case of the noble metals, it is normally preferred to use about 0.05 to about 2 wt % noble metal.

The method for incorporating the hydrogenating metal is to contact the base material with an aqueous solution of a suitable compound of the desired metal wherein the metal is present in a cationic form. Following addition of the selected hydrogenating metal or metals, the resulting catalyst powder is then filtered, dried, pelleted with added lubricants, binders or the like if desired, and calcined in air at temperatures of, e.g., about 371° C. (700° F.) to about 648° C. (1200° F.) in order to activate the catalyst and decompose ammonium ions. Alternatively, the base component may first be pelleted, followed by the addition of the hydrogenating component and activation by calcining.

The foregoing catalysts may be employed in undiluted form, or the powdered catalyst may be mixed and copelleted with other relatively less active catalysts, diluents or binders such as alumina, silica gel, silica-alumina cogels, activated clays and the like in proportions ranging between about 5 and about 90 wt %. These diluents may be employed as such or they may contain a minor proportion of an added hydrogenating metal such as a Group VIB and/or Group VIII metal. Additional metal promoted hydrocracking catalysts may also be utilized in the process of the present invention which comprises, for example, aluminophosphate molecular sieves, crystalline chromosilicates and other crystalline silicates. Crystalline chromosilicates are more fully described in U.S. Pat. No. 4,363,718.

By one approach, the hydrocracking conditions may include a temperature from about 290° C. (550° F.) to about 468° C. (875° F.), preferably 343° C. (650° F.) to about 445° C. (833° F.), a pressure from about 4.8 MPa (gauge) (700 psig) to about 20.7 MPa (gauge) (3000 psig), a liquid hourly space velocity (LHSV) from about 0.4 to less than about 2.5 $hr^{-1}$ and a hydrogen rate of about 421 $Nm^3/m^3$ (2,500 scf/bbl) to about 2,527 $Nm^3/m^3$ oil (15,000 scf/bbl). If mild hydrocracking is desired, conditions may include a temperature from about 315° C. (600° F.) to about 441° C. (825° F.), a pressure from about 5.5 MPa (gauge) (800 psig) to about 13.8 MPa (gauge) (2000 psig) or more typically about 6.9 MPa (gauge) (1000 psig) to about 11.0 MPa (gauge) (1600 psig), a liquid hourly space velocity (LHSV) from about 0.5 to about 2 $hr^{-1}$ and preferably about 0.7 to about 1.5 $hr^{-1}$ and a hydrogen rate of about 421 $Nm^3/m^3$ oil (2,500 scf/bbl) to about 1,685 $Nm^3/m^3$ oil (10,000 scf/bbl).

Suitable hydrotreating catalysts for use in the present invention are any known conventional hydrotreating catalysts and include those which are comprised of at least one Group VIII metal, preferably iron, cobalt and nickel, more preferably cobalt and/or nickel and at least one Group VI metal, preferably molybdenum and tungsten, on a high surface area support material, preferably alumina. Other suitable hydrotreating catalysts include zeolitic catalysts, as well as noble metal catalysts where the noble metal is selected from palladium and platinum. More than one type of hydrotreating catalyst may be used in the same hydrotreating reactor 30. The Group VIII metal is typically present in an amount ranging from about 2 to about 20 wt %, preferably from about 4 to about 12 wt %. The Group VI metal will typically be present in an amount ranging from about 1 to about 25 wt %, preferably from about 2 to about 25 wt %.

Preferred hydrotreating reaction conditions include a temperature from about 290° C. (550° F.) to about 455° C. (850° F.), suitably 316° C. (600° F.) to about 427° C. (800° F.) and preferably 343° C. (650° F.) to about 399° C. (750° F.), a pressure from about 2.1 MPa (gauge) (300 psig), preferably 4.1 MPa (gauge) (600 psig) to about 20.6 MPa (gauge) (3000 psig), suitably 12.4 MPa (gauge) (1800 psig), preferably 6.9 MPa (gauge) (1000 psig), a liquid hourly space velocity of the fresh hydrocarbonaceous feedstock from about 0.1 $hr^{-1}$, suitably 0.5 $hr^{-1}$, to about 4 $hr^{-1}$, preferably from about 1.5 to about 3.5 $hr^{-1}$, and a hydrogen rate of about 168 $Nm^3/m^3$ (1,000 scf/bbl), to about 1,011 $Nm^3/m^3$ oil (6,000 scf/bbl), preferably about 168 $Nm^3/m^3$ oil (1,000 scf/bbl) to about 674 Nm³/m³ oil (4,000 scf/bbl), with a hydrotreating catalyst or a combination of hydrotreating catalysts.

The hydroprocessing reactor 30 provides a hydroprocessed effluent stream that exits the hydroprocessing reactor 30 in a hydroprocessed effluent line 32. The hydroprocessed effluent stream may be separated in the separation section 14 comprising one or more separators into a liquid separated hydroprocessed stream and a gaseous separated hydroprocessed stream. The separation section 14 is in downstream communication with the hydroprocessing reactor 30.

The hydroprocessed effluent stream in hydroprocessed effluent line 32 may in an aspect be heat exchanged with the hydrocarbon feed stream in line 26 to be cooled before entering a hot separator 34. The hot separator separates the hydroprocessed effluent stream to provide a hydrocarbonaceous, hot gaseous separated hydroprocessed stream in a hot overhead line 36 and a hydrocarbonaceous, hot liquid separated hydroprocessed stream in a hot bottoms line 38. The hot separator 34 may be in downstream communication with the hydroprocessing reactor 30. The hot separator 34 operates at about 177° C. (350° F.) to about 371° C. (700° F.) and preferably operates at about 232° C. (450° F.) to about 315° C. (600° F.). The hot separator 34 may be operated at a slightly lower pressure than the hydroprocessing reactor 30 accounting for pressure drop through intervening equipment. The hot separator may be operated at pressures between about 3.4 MPa (gauge) (493 psig) and about 20.4 MPa (gauge) (2959 psig). The hydrocarbonaceous, hot gaseous separated hydroprocessed stream in the hot overhead line 36 may have a temperature of the operating temperature of the hot separator 34.

The hot gaseous separated hydroprocessed stream in the hot overhead line 36 may be cooled before entering a cold separator 40. As a consequence of the reactions taking place in the hydroprocessing reactor 30 wherein nitrogen, chlorine and sulfur are removed from the feed, ammonia and hydrogen sulfide are formed. At a characteristic sublimation temperature, ammonia and hydrogen sulfide will combine to form ammonium bisulfide and ammonia, and chlorine will combine to form ammonium chloride. Each compound has a characteristic sublimation temperature that may allow the compound to coat equipment, particularly heat exchange equipment, impairing its performance. To prevent such deposition of ammonium bisulfide or ammonium chloride salts in the hot overhead line 36 transporting the hot gaseous stream, a suitable amount of wash water may be introduced into the hot overhead line 36 upstream of a cooler at a point in the hot overhead line 36 where the temperature is above the characteristic sublimation temperature of either compound.

The hot gaseous stream may be separated in the cold separator 40 to provide a cold gaseous separated hydroprocessed stream comprising a hydrogen-rich gas stream in a cold overhead line 42 and a cold liquid separated hydroprocessed stream in a cold bottoms line 44. The cold separator 40 serves to separate hydrogen rich gas from hydrocarbon liquid in the hydroprocessed effluent for recycle to the hydroprocessing reactor 30 in the cold overhead line 42. The cold separator 40, therefore, is in downstream communication with the hot overhead line 36 of the hot separator 34 and the hydroprocessing reactor 30. The cold separator 40 may be operated at about 100° F. (38° C.) to about 150° F. (66° C.), suitably about 115° F. (46° C.) to about 145° F. (63° C.), and just below the pressure of the hydroprocessing reactor 30 and the hot separator 34 accounting for pressure drop through intervening equipment to keep hydrogen and light gases in the overhead and normally liquid hydrocarbons in the bottoms. The cold separator 40 may be operated at pressures between about 3 MPa (gauge) (435 psig) and about 20 MPa (gauge) (2,901 psig). The cold separator 40 may also have a boot for collecting an aqueous phase. The cold separated hydroprocessed stream in the cold bottoms line 44 may have a temperature of the operating temperature of the cold separator 40.

The cold gaseous stream in the cold overhead line 42 is rich in hydrogen. Thus, hydrogen can be recovered from the cold gaseous stream. The cold gaseous stream in the cold overhead line 42 may be passed through a trayed or packed recycle scrubbing column 46 where it is scrubbed by means of a scrubbing extraction liquid such as an aqueous solution fed by line 47 to remove acid gases including hydrogen sulfide and carbon dioxide by extracting them into the aqueous solution. Preferred aqueous solutions include lean amines such as alkanolamines DEA, MEA, and MDEA. Other amines can be used in place of or in addition to the preferred amines. The lean amine contacts the cold gaseous stream and absorbs acid gas contaminants such as hydrogen sulfide and carbon dioxide. The resultant "sweetened" cold gaseous stream is taken out from an overhead outlet of the recycle scrubber column 46 in a recycle scrubber overhead line 48, and a rich amine is taken out from the bottoms at a bottom outlet of the recycle scrubber column in a recycle scrubber bottoms line 49. The spent scrubbing liquid from the bottoms may be regenerated and recycled back to the recycle scrubbing column 46 in line 47 (not shown). The scrubbed hydrogen-rich stream emerges from the scrubber via the recycle scrubber overhead line 48 and may be compressed in a recycle compressor 50 to provide a recycle hydrogen stream in line 22. The recycle hydrogen stream in line 22 may be supplemented with make-up hydrogen stream in the make-up line 24 to provide the hydrogen stream in hydrogen line 20. A portion of the recycle hydrogen stream in line 22 may be routed to the intermediate catalyst bed outlets in the hydroprocessing reactor 30 to control the inlet temperature of the subsequent catalyst bed (not shown). The recycle scrubbing column 46 may be operated with a gas inlet temperature between about 38° C. (100° F.) and about 66° C. (150° F.) and an overhead pressure of about 3 MPa (gauge) (435 psig) to about 20 MPa (gauge) (2900 psig).

The hydrocarbonaceous hot liquid separated hydroprocessed stream in the hot bottoms line 38 may be fractionated as a hot hydroprocessed effluent stream in the product recovery unit 16. In an aspect, the hot liquid separated hydroprocessed stream in the hot bottoms line 38 may be let down in pressure and flashed in a hot flash drum 52 to provide a flash hot gaseous separated hydroprocessed stream of light ends in a hot flash overhead line 54 and a flash hot liquid separated hydroprocessed stream in a hot flash bottoms line 56. The hot flash drum 52 may be any separator that splits the liquid hydroprocessed effluent into vapor and liquid fractions. The hot flash drum 52 may be in direct, downstream communication with the hot bottoms line 38 and in downstream communication with the hydroprocessing reactor 30. The hot flash drum 52 may be operated at the same temperature as the hot separator 34 but at a lower pressure of between about 1.4 MPa (gauge) (200 psig) and about 6.9 MPa (gauge) (1000 psig), suitably no more than about 3.8 MPa (gauge) (550 psig). The flash hot liquid separated hydroprocessed stream in bottoms line 56 may be further fractionated in the product recovery unit 16. The flash hot liquid separated hydroprocessed stream in the hot flash bottoms line 56 may have a temperature of the operating temperature of the hot flash drum 52.

In an aspect, the cold liquid separated hydroprocessed stream in the cold bottoms line 44 may be fractionated as a cold hydroprocessed effluent stream in the product recovery unit 16. In a further aspect, the cold liquid separated hydroprocessed stream may be let down in pressure and flashed in a cold flash drum 60 to separate the cold liquid separated hydroprocessed stream in the cold bottoms line 44. The cold flash drum 60 may be any separator that splits hydroprocessed effluent into vapor and liquid fractions. The cold flash drum 60 may be in direct downstream communication with the cold bottoms line 44 of the cold separator 40 and in downstream communication with the hydroprocessing reactor 30.

In a further aspect, the flash hot gaseous separated hydroprocessed stream in the hot flash overhead line 54 may be fractionated as a gaseous separated hydroprocessed stream in the product recovery unit 16. In a further aspect, the flash hot gaseous separated hydroprocessed stream may be cooled and also separated in the cold flash drum 60. The cold flash drum 60 may separate the cold liquid separated hydroprocessed stream in line 44 and/or the flash hot gaseous separated hydroprocessed stream in the hot flash overhead line 54 to provide a flash cold gaseous separated hydroprocessed stream in a cold flash overhead line 62 and a flash cold liquid separated hydroprocessed stream in a cold flash bottoms line 64. In an aspect, light gases such as hydrogen sulfide may be stripped from the flash cold separated hydroprocessed stream. Accordingly, a stripping column 70 may be in downstream communication with the cold flash drum 60 and the cold flash bottoms line 64. The cold flash drum 60 may be in downstream communication with the cold bottoms line 44 of the cold separator 40, the hot flash overhead line 54 of the hot flash drum 52 and the hydroprocessing reactor 30. The cold separated hydroprocessed stream in cold bottoms line 44 and the flash hot gaseous stream in the hot flash overhead line 54 may enter into the cold flash drum 60 either together or separately. In an aspect, the hot flash overhead line 54 joins the cold bottoms line 44 and feeds the flash hot gaseous stream and the cold separated hydroprocessed stream together to the cold flash drum 50 in a cold flash feed line 58. The cold flash drum 50 may be operated at the same temperature as the cold separator 40 but typically at a lower pressure of between about 1.4 MPa (gauge) (200 psig) and about 6.9 MPa (gauge) (1000 psig) and preferably between about 3.0 MPa (gauge) (435 psig) and about 3.8 MPa (gauge) (550 psig). A flashed aqueous stream may be removed from a boot in the cold flash drum 60. The flash cold liquid separated hydroprocessed stream in the cold flash bottoms line 64 may have the same temperature as the operating temperature of the cold flash drum 60. The flash cold gaseous separated hydroprocessed stream in the cold flash overhead line 62 contains substantial hydrogen that may be recovered in a light materials recovery unit 180.

The product recovery section 16 may include the stripping column 70, a product fractionation column 100, a stabilizing fractionation column 120, an intermediate fractionation column 140 and a splitter column 160. The stripping column 70 may be in downstream communication with a bottoms line in the separation section 14 for stripping volatiles from the hydroprocessed streams. For example, the stripping column 70 may be in downstream communication with the hot bottoms line 38, the hot flash bottoms line 56, the cold bottoms line 44 and/or the cold flash bottoms line 64. In an aspect, the stripping column 70 may be a vessel that contains a cold stripping column 72 and a hot stripping column 86 with a wall that isolates each of the stripping columns 72, 86 from the other. The cold stripping column 72 may be in downstream communication with the hydroprocessing reactor 30, the cold bottoms line 44 and, in an aspect, the cold flash bottoms line 64 for stripping the cold separated hydroprocessed stream. The hot stripping column 86 may be in downstream communication with the hydroprocessing reactor 30 and the hot bottoms line 38 and, in an aspect, the hot flash bottoms line 56 for stripping the liquid hot separated hydroprocessed stream which is hotter than the cold hydroprocessed stream. In an aspect, the liquid separated hydroprocessed stream may be the flash cold liquid separated hydroprocessed stream in the cold flash bottoms line 64. The liquid separated hydroprocessed stream may be the flash liquid hot separated hydroprocessed stream in the hot flash bottoms line 56. The liquid hot separated hydroprocessed stream may be hotter than the cold separated hydroprocessed stream, by at least 25° C. and preferably at least 50° C.

The flash cold liquid separated hydroprocessed stream in the cold flash bottoms line 64 may be heated and fed to the cold stripping column 72 at an inlet which may be in a top half of the column. The flash cold liquid separated hydroprocessed stream which comprises at least a portion of the hydroprocessed effluent stream in the hydroprocessed effluent line 32 may be stripped in the cold stripping column 72 with a cold stripping media which is an inert gas such as steam from a cold stripping media line 74 to provide a cold stripped gaseous stream of naphtha, hydrogen, hydrogen sulfide, steam and other gases in an overhead line 76 and a liquid hydroprocessed stream in a cold stripper bottoms line 78 sourced from the separation section 14. The cold stripped overhead stream may be condensed and separated in a receiver 80. A stripper net overhead line 82 from the receiver 80 carries a net stripper gaseous stream for further recovery of LPG and hydrogen in the light material recovery unit. Unstabilized liquid naphtha from the bottoms of the receiver 80 may be split between a reflux portion refluxed to the top of the cold stripping column 72 and a stripper liquid overhead stream which may be transported in a condensed stripper overhead line 84 to a stabilizing fractionation column 120. A sour water stream may be collected from a boot of the overhead receiver 80.

The cold stripping column 72 may be operated with a bottoms temperature between about 149° C. (300° F.) and about 288° C. (550° F.), preferably no more than about 260° C. (500° F.), and an overhead pressure of about 0.35 MPa (gauge) (50 psig), preferably no less than about 0.70 MPa (gauge) (100 psig), to no more than about 2.0 MPa (gauge) (290 psig). The temperature in the overhead receiver 80 ranges from about 38° C. (100° F.) to about 66° C. (150° F.) and the pressure is essentially the same as in the overhead of the cold stripping column 72.

The cold liquid hydroprocessed stream in the cold stripper bottoms line 78 may comprise predominantly naphtha and kerosene boiling materials. Consequently, the cold liquid stream in cold stripper bottoms line 78 may be heated and fed to a product fractionation column 100. The product fractionation column 100 may be in downstream communication with the cold stripped bottoms line 78 of the cold stripping column 72 and the stripping column 70. In an aspect, the product fractionation column 100 may comprise more than one fractionation column. The product fractionation column 100 may be in downstream communication with one, some or all of the hot separator 34, the cold separator 40, the hot flash drum 52 and the cold flash drum 60.

The liquid separated hydroprocessed stream may be the flash hot liquid separated hydroprocessed stream in the hot flash bottoms line 56 may be fed to the hot stripping column 86 near a top thereof. The flash liquid hot separated hydroprocessed stream may be stripped in the hot stripping column 86 with a hot stripping media which is an inert gas such as steam from a line 88 to provide a hot stripped overhead stream of naphtha, hydrogen, hydrogen sulfide, steam and other gases in a hot stripper overhead line 90 and hot liquid hydroprocessed stream in a hot stripper bottoms line 92 sourced from the separation section 14. The overhead line 90 may be condensed and a portion refluxed to the hot stripping column 86. However, in the embodiment of FIG. 1, the hot stripped overhead stream in the hot stripper overhead line 90 from the overhead of the hot stripping column 86 may be fed into the cold stripping column 72 directly in an aspect without first condensing or refluxing. The inlet for the cold flash bottoms line 64 carrying the cold liquid separated hydroprocessed effluent stream may be at a higher elevation than the inlet for the overhead line 90. The hot stripping column 86 may be operated with a bottoms temperature between about 160° C. (320° F.) and about 360° C. (680° F.) and an overhead pressure of about 0.35 MPa (gauge) (50 psig), preferably about 0.70 MPa (gauge) (100 psig), to about 2.0 MPa (gauge) (292 psig).

At least a portion of the hot liquid hydroprocessed stream in the hot stripped bottoms line 92 may be heated and fed to the product fractionation column 100. Consequently, the product fractionation column 100 may be in downstream communication with the hot stripped bottoms line 92 of the hot stripping column 86. The hot liquid hydroprocessed stream in line 92 may be at a hotter temperature than the cold liquid hydroprocessed stream in line 78. In an aspect, the hot liquid hydroprocessed stream may be heated and fed to a prefractionation separator 94 for separation into a vaporized hot hydroprocessed stream in a prefractionation overhead line 96 and a prefractionation hot liquid hydroprocessed stream in a prefractionation bottoms line 98. The prefractionation hot liquid hydroprocessed stream may be heated in a fractionation furnace and fed to the product fractionation column 100 in the prefractionation bottoms line 98 at an elevation below the elevation at which the prefractionation overhead line 96 feeds the vaporized hot liquid hydroprocessed stream to the product fractionation column 100.

The product fractionation column 100 may be in downstream communication with the cold stripping column 72 and the hot stripping column 86 and may comprise more than one fractionation column for separating stripped streams into product streams. The product fractionation column 100 may strip the cold liquid hydroprocessed stream and the hot liquid hydroprocessed stream with an inert stripping media stream such as steam from line 102 to provide several product streams. The product streams from the product fractionation column 100 may include a net fractionated overhead stream comprising naphtha in a net overhead line 104, an optional heavy naphtha stream in line 106 from a side cut outlet, a kerosene stream carried in line 108 from a side cut outlet and a diesel stream in line 110 from a side cut outlet. An unconverted oil stream may be provided in a bottoms line 112 which may be recycled to the hydroprocessing reactor 30. Heat may be removed from the fractionation column 100 by cooling at least a portion of the product streams and sending a portion of each cooled stream back to the fractionation column. These product streams may also be stripped to remove light materials to meet product purity requirements. A fractionated overhead stream in an overhead line 114 may be condensed and separated in a receiver 116 with a portion of the condensed liquid being refluxed back to the fractionation column 100. The net fractionated overhead stream in line 104 may be further processed or recovered as naphtha product. The product fractionation column 100 may be operated with a bottoms temperature between about 260° C. (500° F.), and about 385° C. (725° F.), preferably at no more than about 350° C. (650° F.), and at an overhead pressure between about 7 kPa (gauge) (1 psig) and about 69 kPa (gauge) (10 psig). A portion of the unconverted oil stream in the bottoms line 112 may be reboiled and returned to the product fractionation column 100 instead of adding an inert stripping media stream such as steam in line 102 to heat to the fractionation column 100.

The stripper liquid overhead stream in the condensed stripper overhead line 84 contains valuable hydrocarbons that can still be recovered. Hence, it may be transported to a stabilizing fractionation column to be fractionated to recover light hydrocarbons. In an embodiment, the stabilizing fractionation column 120 may be a deethanizer column to fractionate the stripper liquid overhead stream and separate a $C_{2-}$ stream from a $C_{3+}$ hydrocarbon stream. A fractionator gaseous stream in an overhead line 122 may be partially condensed and separated in an overhead receiver 124 into a stabilizer overhead liquid stream for reflux to the column and a net fractionator gaseous stream in a net stabilizer overhead line 126. A stabilized bottoms stream may be withdrawn from a bottom of the stabilizing column 120. A portion of the deethanized bottoms stream may be reboiled and sent back to the stabilizing column while a net stabilized bottoms stream, in an embodiment comprising $C_{3+}$ hydrocarbons and concentrated in LPG and naphtha hydrocarbons, is withdrawn in net stabilizer bottoms line 128. The net stabilizer bottoms stream may be transported to the intermediate fractionation column 140. The stabilizer column 120 may be operated with a bottoms temperature between about 160° C. (320° F.) and about 200° C. (392° F.) and an overhead pressure of about 1 MPa (gauge) (150 psig) to about 2 MPa (gauge) (300 psig).

The intermediate fractionation column 140 may fractionate the net stabilizer bottoms stream in the net stabilized bottoms line 128 into an overhead stream comprising intermediate product and an intermediate bottoms stream. In an embodiment, the intermediate fractionation column 140 is a debutanizer column that produces an overhead stream comprising LPG product and a bottoms stream comprising $C_5+$ naphtha. The intermediate overhead stream may be fully condensed and a condensed stream from an intermediate overhead receiver bottoms may be split between a reflux stream refluxed to the intermediate column and a net liquid overhead stream that may comprise an LPG product stream that may be recovered in a net liquid product line 142 or further processed such as in a caustic treatment process to remove sulfur compounds from the LPG product stream. An intermediate bottoms stream may comprise a full range naphtha product stream. A portion of the intermediate bottoms stream may be reboiled and returned to the intermediate column 140. A net portion of the intermediate bottoms stream may be further fractionated in a splitter column 160. Alternatively, the portion of the net intermediate bottoms stream in the net intermediate bottoms line 144 may be recovered as a full range naphtha product stream or used as sponge oil. The intermediate fractionation column 140 may be operated with a bottoms temperature between about 180° C. (356° F.) and about 220° C. (430° F.) and an overhead pressure of about 0.8 MPa (gauge) (120 psig) to about 1.7 MPa (gauge) (250 psig).

The splitter fractionation column 160 may fractionate the net intermediate bottoms stream in the net intermediate bottoms line 144 into an overhead stream comprising a light split product and a heavy split product. In an embodiment, the splitter fractionation column 160 is a naphtha splitter column that produces an overhead stream comprising light naphtha product comprising $C_5$ and $C_6$ hydrocarbons and a bottoms stream comprising heavy naphtha product comprising $C_7+$ hydrocarbons. Other streams are contemplated. The light split product in the overhead line may be fully condensed and a condensed stream from an splitter overhead receiver bottoms may be split between a reflux stream refluxed to the splitter column 160 and a net light split product stream that may be recovered in a light split product line 162 or further processed such as in an isomerization process. A portion of the heavy split product stream in a heavy split bottoms line 164 may be reboiled and returned to the splitter column 160. Another portion of the heavy split bottoms stream in a heavy split bottoms line 164 may be recovered in heavy split product line 166 as heavy split product or further processed such as in a reforming process. A further portion of the heavy split product in the heavy split bottoms line 164 may be used as sponge absorbent in sponge absorbent line 168. The heavy split product in heavy split product line may comprise a heavy naphtha stream. The splitter fractionation column 160 may be operated with a bottoms temperature between about 180° C. (356° F.) and about 220° C. (430° F.) and an overhead pressure of about 0.8 MPa (gauge) (120 psig) to about 1.7 MPa (gauge) (250 psig).

The net stripper gaseous stream in the net stripper overhead line 82 from the receiver 80 is typically at a pressure of about 0.35 MPa (gauge) (50 psig) to about 2.0 MPa (gauge) (290 psig), which is too low for hydrogen recovery in a pressure swing recovery unit (PSA) unit. Hence, the hydrogen in this stream is typically forfeited. However, refiners often have a PSA unit for recovery of hydrogen from the gaseous separated hydroprocessed stream such as the flash cold gaseous separated hydroprocessed stream in the cold flash overhead line 62. It is proposed to increase the pressure of the stripper gaseous stream to enable recovery of both hydrogen and LPG from the stripper gaseous stream and the gaseous separated hydroprocessed stream together in the light materials recovery unit 180.

The net fractionator gaseous stream in the net stabilizer overhead line 126 may contain some $C_3+$ materials as well hydrogen that can be recovered in the light materials recovery unit 180. It is alternatively proposed to increase the pressure of the fractionator gaseous stream in the net stabilizer overhead line 126 to enable recovery of both hydrogen and LPG from the fractionator gaseous stream and the gaseous separated hydroprocessed stream together in the light materials recovery unit 180.

In an embodiment, the fractionator gaseous stream in the net stabilizer overhead line 126 may be mixed with the net stripper gaseous stream in the net stripper overhead line 82 to be processed together. However, it should be understood that either of these streams can be processed as described without the other. The mixed stream of the net stripper gaseous stream and the fractionator gaseous stream may be transported together or each separately in compressor feed line 130. The compressor feed line 130 transports the net stripper gaseous stream and/or the fractionator gaseous stream to a compressor 132, which may be a screw compressor, but any compressor may be suitable. The compressor 132 increases the pressure of the net stripper gaseous stream and/or the fractionator gaseous stream to a pressure of about 1.4 MPa (gauge) (200 psig) to about 6.9 MPa (gauge) (1000 psig) and preferably about 3.0 MPa (gauge) (435 psig) to about 3.5 MPa (gauge) (508 psig). The compressed, net stripper gaseous stream and/or the compressed, fractionator gaseous stream may be fed from the compressor 132 to a knock out drum 134 to remove a compressed, condensed stream in a knockout bottoms line 136 for transport to cold flash bottoms line 64 in route to the stripper column 70. The vapor phase of the compressed net stripper gaseous stream and/or the compressed, fractionator gaseous stream may be transported in compressor line 138. The knock out drum 134 may be in downstream communication with the net stripper overhead line 82.

We have also found that the flash cold gaseous separated hydroprocessed stream in the cold flash overhead line 62 comprises about 60 to about 90 mol %, suitably about 65 to about 85 mol % and preferably about 70 to about 80 mol % hydrogen. The pressure of the flash cold gaseous stream of between about 1.4 MPa (gauge) (200 psig) and about 6.9 MPa (gauge) (1000 psig) and preferably between about 3.0 MPa (gauge) (435 psig) and about 3.5 MPa (gauge) (508 psig) is sufficient to permit recovery of hydrogen without requiring compression. Accordingly, the compressed net stripper gaseous stream and/or the compressed fractionator gaseous stream may be combined with the flash cold gaseous separated hydroprocessed stream in the cold flash overhead line 62 and transported in a light recovery feed line 182 to the light materials recovery unit 180 for the recovery of hydrogen and LPG.

The light materials recovery section may include a series of units starting with a scrubber column 190 to remove acid gases, a sponge absorber column 200 to recover LPG and a hydrogen recovery unit 210 to recovery hydrogen. The compressed net stripper gaseous stream and/or the compressed fractionator gaseous stream combined with the flash cold gaseous separated hydroprocessed stream in the light recovery feed line 134 may first be scrubbed by contact with a scrubbing solvent in the scrubber column 150 to remove acid gases. A preferred scrubbing solvent includes lean amines such as alkanolamines, DEA, MEA, and MDEA. Other amines can be used in place of or in addition to the preferred amines. The lean solvent fed from line 192 at the top of the scrubbing column contacts the flash cold gaseous separated hydroprocessed stream and the stripper gaseous stream and/or the fractionator gaseous stream to absorb acid gases therefrom together by countercurrent contact with the solvent stream. The solvent absorbs acid gas contaminants such as hydrogen sulfide and carbon dioxide. A resultant "sweetened" absorbed, flash cold gaseous separated hydroprocessed stream and an absorbed, stripper gaseous stream and/or an absorbed, fractionator gaseous stream are withdrawn through an overhead outlet of the scrubber column in a scrubber overhead line 194, and a rich solvent stream is taken out from the bottoms at a bottom outlet of the scrubber column 190 in a scrubber bottoms line 196. The rich solvent may undergo regeneration to remove the hydrogen sulfide for processing to generate elemental sulfur and recycled to the column in line 192. The scrubbing column 190 may be operated with a gas inlet temperature between about 30° C. (86° F.) and about 66° C. (150° F.) and an overhead pressure of between about 1.4 MPa (gauge) (200 psig) and about 6.9 MPa (gauge) (1000 psig) and preferably between about 3.0 MPa (gauge) (435 psig) and about 3.5 MPa (gauge) (508 psig). The absorbed flash cold gaseous separated hydroprocessed stream and the absorbed stripper gaseous stream and/or the absorbed fractionator gaseous stream are fed to the sponge absorber 200.

The multi-tray sponge absorber column 200 receives the sweetened, absorbed flash cold gaseous separated hydroprocessed stream and the absorbed stripper gaseous stream and/or the absorbed fractionator gaseous stream from the scrubber overhead line 194 at a lower inlet. The sponge absorber 200 may include an upper inlet at a tray location near or above a middle of the sponge absorber column 200 which is at an elevation that is above the lower inlet. At the upper inlet, the sponge absorber column 200 receives the sponge oil which may be naphtha from the intermediate bottoms line 144 or from the heavy naphtha line 168. In the sponge absorber 200, the lean sponge oil and the sweetened, absorbed flash cold gaseous separated hydroprocessed stream and the stripper gaseous stream and/or the absorbed fractionator gaseous stream are counter currently contacted. In the sponge absorber 200, the lean sponge oil and the flash cold gaseous separated hydroprocessed stream and the absorbed stripper gaseous stream and/or the absorbed fractionator gaseous stream from the scrubber overhead line 194 are counter currently contacted, and the sponge oil absorbs, extracts, and separates $C_3+$ hydrocarbons therefrom. The hydrocarbons absorbed by the sponge oil include methane and ethane, substantial LPG, $C_3$ and $C_4$ hydrocarbons, and small amounts of $C_5$, and $C_{6+}$ hydrocarbons in the absorbed flash cold gaseous separated hydroprocessed stream and the absorbed stripper gaseous stream and/or the absorbed fractionator gaseous stream.

The sponge absorber 200 operates at a temperature of about 34° C. (93° F.) to 60° C. (140° F.) and an overhead pressure of between about 1.4 MPa (gauge) (200 psig) and about 6.9 MPa (gauge) (1000 psig) and preferably between about 3.0 MPa (gauge) (435 psig) and about 3.5 MPa (gauge) (508 psig). We have found at the preferred pressure, the sponge oil requirement is only 40% of the base case at conventional pressure of about 0.35 MPa (gauge) (50 psig) to about 2.0 MPa (gauge) (290 psig). Additionally, at the preferred pressure, LPG recovery is 10 wt % higher than the base case.

A sponge absorption off gas stream comprising remaining light gas components of the flash cold gaseous separated hydroprocessed stream and the stripper gaseous stream and/or the fractionator gaseous stream is withdrawn from a top of the sponge absorber column 200 at an overhead outlet through a sponge absorber overhead line 202. A sponge absorbent stream rich in LPG hydrocarbons is withdrawn in a sponge absorber bottoms line 204 from a bottom of the sponge absorber column 200 at a bottoms outlet. The rich absorbent stream in the sponge absorber bottoms line 204 may be fed to the stabilizer column 120 via line 84 for recovery of LPG and naphtha by separation from light gas.

The pressure of the sponge absorber 200 is regulated by a control valve 206 on the overhead line 202 to regulate the pressure in the cold flash overhead line 62 measured by a pressure indicator controller 208. A computer 209 communicates a manipulable predetermined set point to the upstream pressure indicator controller 208 which signals adjustment to the control valve 206 to open proportionally more to reduce the pressure or close proportionally more to increase pressure in the cold flash overhead line 62 to match the pressure set point and maintain desired pressure in line 62. Similarly, pressures are maintained in lines 82 and 126 by control valves linked to pressure indicator controllers with set points communicated by the computer 209.

The sponge absorption off gas stream in the sponge absorber overhead line 202 comprising light gases remaining in the flash cold gaseous separated hydroprocessed stream and the stripper gaseous stream and/or the fractionator gaseous stream may be transported to the hydrogen recovery unit 210 for hydrogen recovery.

The sponge absorption off gas stream in the sponge absorber overhead line 202 may be fed to a hydrogen recovery unit 210 which may comprise a pressure swing adsorption (PSA) unit 212 to adsorb impurities from hydrogen in the absorbed, flash cold gaseous separated hydroprocessed stream and the stripper gaseous stream and/or the fractionator gaseous stream in the sponge absorber overhead line 202. The hydrogen recovery unit 210 may also comprise a membrane unit. In the preferred PSA unit 212, impurities are adsorbed from hydrogen in the flash cold gaseous separated hydroprocessed stream and the stripper gaseous stream and/or the fractionator gaseous stream to provide a tail gas stream in tail gas line 214 and a purified hydrogen stream in product line 216. The pressure swing adsorption process separates hydrogen from larger molecules in the flash cold gaseous separated hydroprocessed stream and the stripper gaseous stream and/or the fractionator gaseous stream fed by the scrubber overhead line 202. The larger molecules are adsorbed on an adsorbent at a high adsorption pressure while allowing passage of the smaller hydrogen molecules. Pressure reduction is effected to a lower desorption pressure to desorb the adsorbed larger molecules in the tail gas stream in tail gas line 214. It is generally desirable to employ the PSA process in multiple bed systems such as those described in U.S. Pat. No. 3,430,418, in which at least four adsorption beds are employed. The PSA process is carried out in such systems on a cyclical basis, employing a processing sequence. The purified hydrogen stream in product line 216 has a reduced concentration of hydrogen sulfide, ammonia, amines and hydrocarbons and a greater hydrogen purity than in the absorbed, flash cold gaseous separated hydroprocessed stream and the stripper gaseous stream and/or the fractionator gaseous stream in the scrubber overhead line 202. The PSA unit 212 may be in direct, downstream communication with the scrubber overhead line 202.

Figure 2:
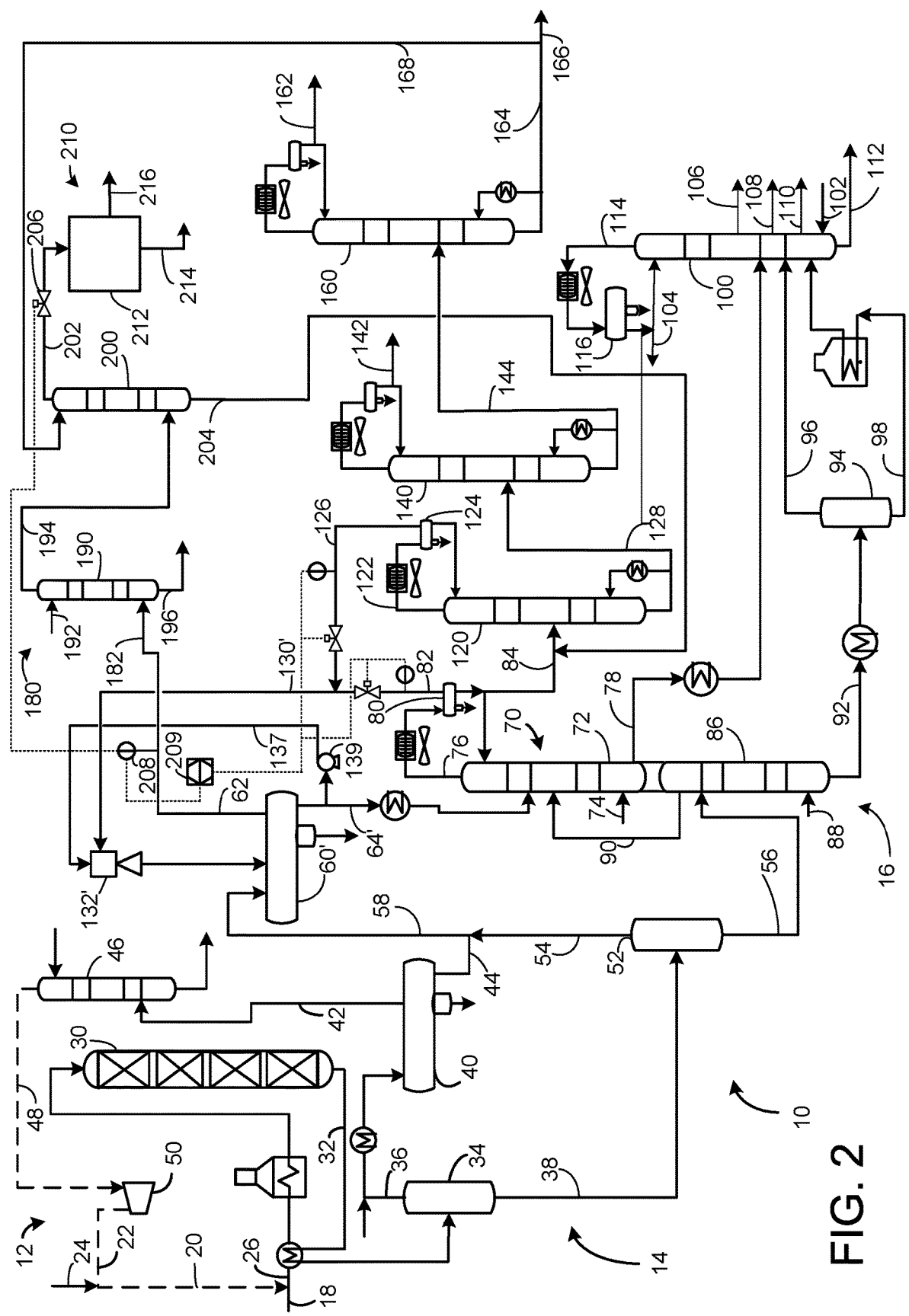
FIG. 2 is a schematic drawing of a hydroprocessing unit with an alternative recovery section.

FIG. 2 shows an embodiment in which an eductor 132' is used to compress the stripper gaseous stream and/or the fractionator gaseous stream. Elements in FIG. 2 with the same configuration as in FIG. 1 will have the same reference numeral as in FIG. 1. Elements in FIG. 2 which have a different configuration as the corresponding element in FIG. 1 will have the same reference numeral but designated with a prime symbol ('). The configuration and operation of the embodiment of FIG. 2 is essentially the same as in FIG. 1 with the following exceptions.

A compressor feed line 130' recycles a net stripper gaseous stream from the stripper net overhead line 82 and/or a fractionator gaseous stream from the net stabilizer overhead line 126 to the eductor 132' for compressing the net stripper gaseous stream and/or the fractionator gaseous stream. A portion of the flash cold liquid separated hydroprocessed stream is taken from the cold flash bottoms line 64' and pumped around in a pump line 137 to an inlet of the eductor 132'. The recirculated flash cold liquid separated hydroprocessed stream in recycle line 137 is circulated by a pump 139 at a rate sufficient to increase the pressure of the net stripper gaseous stream and/or the fractionator gaseous stream to the pressure of the cold flash drum 60'. The compressed net stripper gaseous stream and/or the fractionator gaseous stream are enabled to enter the cold flash drum 60' and a stream of mixed flash cold gaseous separated hydroprocessed stream and the net stripper gaseous stream and/or the net fractionator gaseous stream exit the cold flash drum in the cold flash overhead line 62 at the higher pressure of the cold flash drum 60' for transport to the light materials recovery unit 180 as previously described with respect to FIG. 1. It is also contemplated that the cold liquid separated hydroprocessed stream in the cold bottoms line 44 may alternatively be pumped into the eductor 132' to increase the pressure of the net stripper gaseous stream and/or the fractionator gaseous stream.

Figure 3:
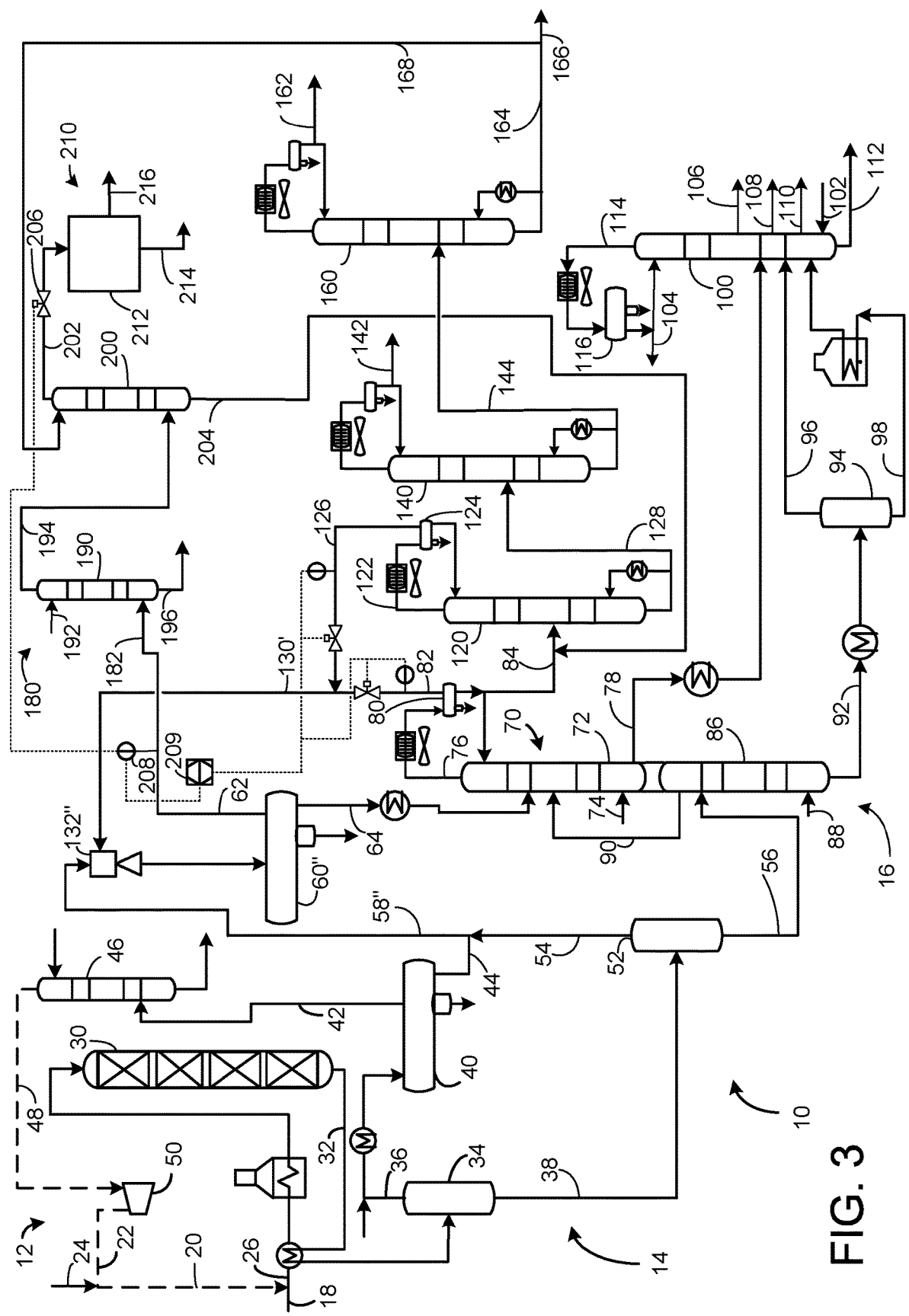
FIG. 3 is a schematic drawing of a hydroprocessing unit with a further alternative recovery section.

FIG. 3 shows an alternative embodiment in which an eductor 132" is used to compress the stripper gaseous stream and/or the fractionator gaseous stream. Elements in FIG. 3 with the same configuration as in FIG. 1 or 2 will have the same reference numeral as in FIG. 1 or 2, respectively. Elements in FIG. 3 which have a different configuration as the corresponding element in FIG. 1 and FIG. 2 will have the same reference numeral but designated with a double prime symbol ("). The configuration and operation of the embodiment of FIG. 3 is essentially the same as in FIG. 2 except the cold liquid separated hydroprocessed stream in the cold bottoms line 44 is transported to an inlet of the eductor 132" through the cold flash feed line 58". The pressure of the cold liquid separated hydroprocessed stream is sufficient to increase the pressure of the net stripper gaseous stream and/or the fractionator gaseous stream to the pressure of the cold flash drum 60". The compressed net stripper gaseous stream and/or the fractionator gaseous stream are enabled to enter the cold flash drum 60" and a stream of mixed flash cold gaseous separated hydroprocessed stream and the net stripper gaseous stream and/or the net fractionator gaseous stream exit the cold flash drum in the cold flash overhead line 62 at the higher pressure of the cold flash drum 60' for transport to the light materials recovery unit 180 as previously described with respect to FIG. 1. It is also contemplated that the flash hot gaseous separated hydroprocessed stream in the hot flash overhead line 54 may bypass the eductor 132" and be directed to the cold flash drum 60" separately from the cold liquid separated hydroprocessed stream in the cold flash feed line 58".

Example

In a case study, we compared the advantages of the present process with increased pressure of the stripper gaseous stream to 3.5 MPa (gauge) (500 psig) and compared it to the conventional process which does not pressurize the stripper gaseous stream, so that it had a maximum pressure of 2.0 MPa (gauge) (290 psig). The comparative results are shown in the Table.

TABLE

| Parameters | Units | Conventional Scheme | Proposed Scheme |
|---|---|---|---|
| Hydrogen Lost in the Net Stripper Gaseous Stream | lbmol/hr | 183 | 0 |
| Hydrogen Recovered from the Flash Cold Gaseous Separated Hydroprocessed Stream and the Net Stripper Gaseous Stream in the PSA | lbmol/hr | 669 | 848 |
| LPG Recovered from the Flash Cold Gaseous Separated Hydroprocessed Stream and the Net Stripper Gaseous Stream in the Sponge Absorber | lb/hr | 4720 | 5152 |
| Sponge Oil Rate | lb/hr | 121117 | 48000 |

In the proposed process, no hydrogen is lost in the net stripper gaseous stream. Conventionally, hydrogen is lost in the net stripper gaseous stream because it is not recovered but sent to the fuel header and burned as fuel. Hydrogen recovery increased by 27% due to the higher pressure. In the proposed process, LPG recovery is increased by 10 wt % while the sponge oil rate decreased by 2.5 times.

Specific Embodiments

While the following is described in conjunction with specific embodiments, it will be understood that this description is intended to illustrate and not limit the scope of the preceding description and the appended claims.

A first embodiment of the invention is a process for recovering hydrogen comprising hydroprocessing a hydrocarbon feed stream in a hydroprocessing reactor to provide a hydroprocessed effluent stream; separating the hydroprocessed effluent stream in a separation section comprising a separator to provide a liquid separated hydroprocessed stream and a gaseous separated hydroprocessed stream; stripping the liquid separated hydroprocessed stream to provide a stripper gaseous stream; and absorbing $C_3+$ hydrocarbons from the gaseous separated hydroprocessed stream and the stripper gaseous stream together by contact with a sponge oil. An embodiment of the invention is one, any or all of prior embodiments in this paragraph up through the first embodiment in this paragraph wherein the stripping step comprises condensing a stripper overhead stream and separating the stripper gaseous stream from a stripper liquid overhead stream. An embodiment of the invention is one, any or all of prior embodiments in this paragraph up through the first embodiment in this paragraph further comprising fractionating the stripper liquid overhead stream to provide a fractionator gaseous stream and recovering C3+ hydrocarbons from the fractionator gaseous stream with the stripper gaseous stream and the gaseous separated hydroprocessed stream. An embodiment of the invention is one, any or all of prior embodiments in this paragraph up through the first embodiment in this paragraph further comprising increasing the pressure of the stripper gaseous stream. An embodiment of the invention is one, any or all of prior embodiments in this paragraph up through the first embodiment in this paragraph further comprising maintaining pressure of the absorption step by adjusting a control valve on an overhead line when an upstream pressure indicator controller does not match a set point. An embodiment of the invention is one, any or all of prior embodiments in this paragraph up through the first embodiment in this paragraph further comprising recycling the stripper gaseous stream to the separator through an eductor to increase the pressure of the stripper gaseous stream. An embodiment of the invention is one, any or all of prior embodiments in this paragraph up through the first embodiment in this paragraph further comprising recovering hydrogen from the gaseous separated hydroprocessed stream and the stripper gaseous stream together. An embodiment of the invention is one, any or all of prior embodiments in this paragraph up through the first embodiment in this paragraph further comprising absorbing acid gases from the stripper gaseous stream and the gaseous separated hydroprocessed stream together by contact with a solvent. An embodiment of the invention is one, any or all of prior embodiments in this paragraph up through the first embodiment in this paragraph further comprising adsorbing impurities from hydrogen in the gaseous separated hydroprocessed stream and the stripper gaseous stream together. An embodiment of the invention is one, any or all of prior embodiments in this paragraph up through the first embodiment in this paragraph wherein the separation step further comprises separating the hydroprocessed effluent stream in a hot separator to provide a hot gaseous separated hydroprocessed stream and a hot liquid separated hydroprocessed stream; separating the hot gaseous separated hydroprocessed stream in a cold separator to provide a cold gaseous separated hydroprocessed stream and a cold liquid separated hydroprocessed stream and/or separating the hot liquid separated hydroprocessed stream in a hot flash drum to provide a flash hot gaseous separated hydroprocessed stream and a flash hot liquid separated hydroprocessed stream; and separating the flash hot gaseous separated hydroprocessed stream and/or the cold liquid separated hydroprocessed stream in a cold flash drum to provide a flash cold gaseous separated hydroprocessed stream, which is the gaseous separated hydroprocessed stream, and a flash cold liquid separated hydroprocessed stream, which is the liquid separated hydroprocessed stream.

A second embodiment of the invention is a process for recovering hydrogen comprising hydroprocessing a hydrocarbon feed stream in a hydroprocessing reactor to provide a hydroprocessed effluent stream; separating the hydroprocessed effluent stream in a separation section comprising a separator to provide a liquid separated hydroprocessed stream and a gaseous separated hydroprocessed stream; stripping the liquid separated hydroprocessed stream; condensing a stripper overhead stream; separating a condensed stripper overhead stream to provide a stripper gaseous stream a stripper liquid overhead stream; fractionating the stripper liquid overhead stream to provide a fractionator gaseous stream; and absorbing $C_3+$ hydrocarbons from the gaseous separated hydroprocessed stream and the fractionator gaseous stream together by contact with a sponge oil. An embodiment of the invention is one, any or all of prior embodiments in this paragraph up through the second embodiment in this paragraph further comprising recovering C3+ hydrocarbons from the fractionator gaseous stream with the gaseous separated hydroprocessed stream and the stripper gaseous stream. An embodiment of the invention is one, any or all of prior embodiments in this paragraph up through the second embodiment in this paragraph further comprising recovering hydrogen from the gaseous separated hydroprocessed stream and the fractionator gaseous stream together. An embodiment of the invention is one, any or all of prior embodiments in this paragraph up through the second embodiment in this paragraph further comprising absorbing acid gases from the gaseous separated hydroprocessed stream and the fractionator gaseous stream together by contact with a solvent. An embodiment of the invention is one, any or all of prior embodiments in this paragraph up through the second embodiment in this paragraph further comprising adsorbing impurities from hydrogen in the gaseous separated hydroprocessed stream and the fractionator gaseous stream together.

A third embodiment of the invention is a process for recovering LPG comprising hydroprocessing a hydrocarbon feed stream in a hydroprocessing reactor to provide a hydroprocessed effluent stream; separating the hydroprocessed effluent stream in a separation section comprising a separator to provide a liquid separated hydroprocessed stream and a gaseous separated hydroprocessed stream; stripping the liquid separated hydroprocessed stream; condensing a stripper overhead stream; separating a condensed stripper overhead stream to provide a stripper gaseous stream a stripper liquid overhead stream; fractionating the stripper liquid overhead stream to provide a fractionator gaseous stream; and absorbing $C_3+$ hydrocarbons from the gaseous separated hydroprocessed stream, the stripper gaseous stream and the fractionator gaseous stream together. An embodiment of the invention is one, any or all of prior embodiments in this paragraph up through the third embodiment in this paragraph further comprising increasing the pressure of the stripper gaseous stream. An embodiment of the invention is one, any or all of prior embodiments in this paragraph up through the third embodiment in this paragraph further comprising recycling the stripper gaseous stream and the fractionator gaseous stream to the separator through an eductor to increase the pressure of the stripper gaseous stream. An embodiment of the invention is one, any or all of prior embodiments in this paragraph up through the third embodiment in this paragraph further comprising recovering hydrogen from the gaseous separated hydroprocessed stream, the fractionator gaseous stream and the stripper gaseous stream together. An embodiment of the invention is one, any or all of prior embodiments in this paragraph up through the third embodiment in this paragraph further comprising absorbing acid gases from the gaseous separated hydroprocessed stream, the fractionator gaseous stream and the fractionator gaseous stream together by contact with a solvent.

Without further elaboration, it is believed that using the preceding description that one skilled in the art can utilize the present invention to its fullest extent and easily ascertain the essential characteristics of this invention, without departing from the spirit and scope thereof, to make various changes and modifications of the invention and to adapt it to various usages and conditions. The preceding preferred specific embodiments are, therefore, to be construed as merely illustrative, and not limiting the remainder of the disclosure in any way whatsoever, and that it is intended to cover various modifications and equivalent arrangements included within the scope of the appended claims.

In the foregoing, all temperatures are set forth in degrees Celsius and, all parts and percentages are by weight, unless otherwise indicated.

The invention claimed is:

1. A process for recovering hydrogen comprising:
hydroprocessing a hydrocarbon feed stream in a hydroprocessing reactor to provide a hydroprocessed effluent stream;
separating said hydroprocessed effluent stream in a separation section comprising a separator to provide a liquid separated hydroprocessed stream and a gaseous separated hydroprocessed stream;
stripping said liquid separated hydroprocessed stream to provide a stripper gaseous stream having a pressure of about 0.35 MPa (gauge) to about 2.0 MPa (gauge);
increasing the pressure of the stripper gaseous stream to about 1.4 MPa (gauge) to about 6.9 MPa (gauge);
absorbing $C_3+$ hydrocarbons from said gaseous separated hydroprocessed stream and said stripper gaseous stream together by contact with a sponge oil in a sponge absorber, wherein said sponge absorber operates at an overhead pressure of between about 1.4 MPa (gauge) and about 6.9 MPa (gauge); and
recovering hydrogen from said gaseous separated hydroprocessed stream and said stripper gaseous stream together.

2. The process of claim 1 wherein said stripping step comprises condensing a stripper overhead stream and separating said stripper gaseous stream from a stripper liquid overhead stream.

3. The process of claim 2 further comprising fractionating said stripper liquid overhead stream to provide a fractionator gaseous stream and recovering C3+ hydrocarbons from said fractionator gaseous stream with said stripper gaseous stream and said gaseous separated hydroprocessed stream.

4. The process of claim 1 further comprising maintaining pressure of said absorption step by adjusting a control valve on an overhead line when an upstream pressure indicator controller does not match a set point.

5. The process of claim 1, wherein said stripper gaseous stream is passed through an eductor to increase the pressure of said stripper gaseous stream.

6. The process of claim 1 further comprising absorbing acid gases from said stripper gaseous stream and said gaseous separated hydroprocessed stream together by contact with a solvent.

7. The process of claim 1 further comprising adsorbing impurities from hydrogen in said gaseous separated hydroprocessed stream and said stripper gaseous stream together.

8. The process of claim 1 wherein said separation step further comprises: separating said hydroprocessed effluent stream in a hot separator to provide a hot gaseous separated hydroprocessed stream and a hot liquid separated hydroprocessed stream; separating said hot gaseous separated hydroprocessed stream in a cold separator to provide a cold gaseous separated hydroprocessed stream and a cold liquid separated hydroprocessed stream and/or separating said hot liquid separated hydroprocessed stream in a hot flash drum to provide a flash hot gaseous separated hydroprocessed stream and a flash hot liquid separated hydroprocessed stream; and separating said flash hot gaseous separated hydroprocessed stream and/or said cold liquid separated hydroprocessed stream in a cold flash drum to provide a flash cold gaseous separated hydroprocessed stream, which is said gaseous separated hydroprocessed stream, and a flash cold liquid separated hydroprocessed stream, which is said liquid separated hydroprocessed stream.

9. The process of claim 1 further comprising separating said gaseous separated hydroprocessed stream in a cold flash drum to provide a cold gaseous separated hydroprocessed stream and a cold liquid separated hydroprocessed stream.

10. The process of claim 1, wherein the stripper gaseous stream is passed to a compressor to increase the pressure of the stripper gaseous stream.

* * * * *